United States Patent [19]
Mir

[11] 4,378,568
[45] Mar. 29, 1983

[54] LIGHT VALVE IMAGING APPARATUS AND METHOD FOR PROVIDING GRAY SCALE

[75] Inventor: José M. Mir, Rochester, N.Y.

[73] Assignee: Eastman Kodak Company, Rochester, N.Y.

[21] Appl. No.: 230,092

[22] Filed: Jan. 29, 1981

[51] Int. Cl.³ .............................................. H04N 1/46
[52] U.S. Cl. ...................................... 358/75; 358/296; 355/32; 355/4
[58] Field of Search ...................... 358/60, 61, 75, 56, 358/213, 285, 286, 296, 300, 302, 80, 78; 355/4, 5, 18, 32, 37, 38, 67, 70, 71; 350/370, 374, 356, 378, 380, 400, 403; 353/20

[56] References Cited

U.S. PATENT DOCUMENTS

| | | | |
|---|---|---|---|
| 3,428,743 | 2/1969 | Hanlon | 358/61 |
| 3,470,310 | 9/1969 | Shashoua | 358/61 |
| 3,930,119 | 12/1975 | Schmidt | 358/285 |
| 4,074,319 | 2/1978 | Goldschmidt | 358/230 |
| 4,129,357 | 12/1978 | Frosch | 350/403 |
| 4,229,095 | 10/1980 | Mir | 358/75 |
| 4,294,524 | 10/1981 | Stolov | 358/59 |
| 4,316,196 | 2/1982 | Jacobs | 350/356 |

Primary Examiner—Michael A. Masinick
Attorney, Agent, or Firm—John D. Husser

[57] ABSTRACT

Electronic imaging apparatus and method of the kind utilizing a light valve array including a line of discretely-addressable pixels activatable between a light transmitting and light blocking state by an electrical field features addressing of such pixels by means of a plurality of discrete sub-period activations which in combination effect proper transmission for a line of the image to be reproduced. In one embodiment the sub-period activations are of different duration and binarily related.

21 Claims, 6 Drawing Figures

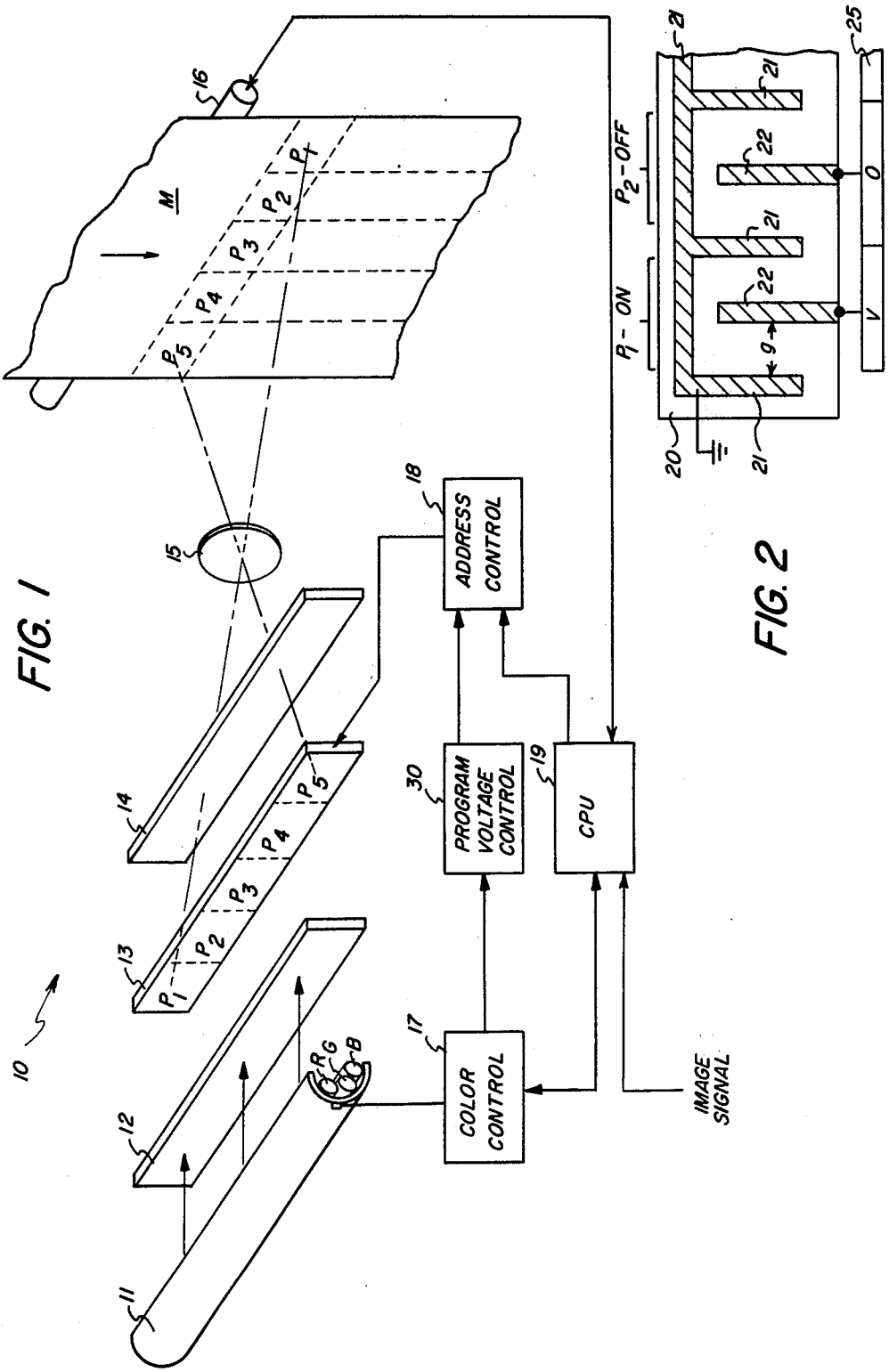

LIGHT VALVE IMAGING APPARATUS AND METHOD FOR PROVIDING GRAY SCALE

CROSS-REFERENCE TO RELATED APPLICATIONS

Reference is made herein to U.S. patent application Ser. No. 230,096, entitled "Electronic Color Imaging Apparatus Having Improved Color Control Device", filed Jan. 29, 1981, in the name of J. M. Mir; U.S. patent application Ser. No. 230,089, entitled "Light Valve Imaging Apparatus Having Improved Optical Configuration", filed Jan. 29, 1981, in the name of J. R. Varner; U.S. patent application Ser. No. 230,095, entitled "Light Valve Imaging with Optimized Addressing Potential(s) to Reduce Inter-Pixel Nonuniformity", filed Jan. 29, 1981, in the name of J. M. Mir and U.S. patent application Ser. No. 230,099, entitled "Light Valve Imaging Apparatus Having Improved Addressing Electrode Structure", filed Jan. 29, 1981, in the names of J. M. Mir and J. R. Varner.

BACKGROUND OF THE INVENTION

1. Field of the Invention

The present invention relates to apparatus and method for forming an image (on a recording medium or for viewing) from an electrical signal and more particularly to improvements in electronic imaging apparatus and method of the kind using an array of individually addressable light valves.

2. Brief Description of the Prior Art

My U.S. Pat. No. 4,229,095 discloses various embodiments of electronic color-imaging apparatus that utilize arrays of separately-addressable, pixel (picture element) sized, electro-optical means to effect multicolor exposure of panchromatic imaging media. One preferred kind of electro-optical means disclosed in that patent is a light valve comprising a panel of ferroelectric ceramic material, such as lanthanum doped lead zirconate titanate (PLZT) sandwiched between crossed polarizers and activated to operate in a quadratic Kerr cell mode. Thus an array of such light valves comprises a panel of PLZT material with a plurality of interleaved electrodes formed on one major surface in a manner facilitating the selective application of discrete electrical fields across (in a direction perpendicular to the direction of viewing) discrete surface areas of the plate. Upon application of such fields, the PLZT material becomes birefringent and rotates the direction of polarization of incident light by an extent dependent on the field magnitude. This results in the transmission of light through the PLZT panel and polarizers varying as a function of the electric fields. A color image is formed electronically by selectively opening and closing of such light valves in synchronization with the energization of red, green and blue exposing sources and according to the red, green and blue color information for the pixels of that image.

My above-mentioned patent also teaches that, for continuous tone imaging, the electrical energization of the light valves can be varied to provide density variations, i.e., a gray scale. Three exemplary modes for varying such electrical energization are described, viz (1) varying the voltage level that is continuously applied during a nominal exposure period; (2) varying the period of voltage application with a nominal voltage magnitude; and (3) providing a stepped voltage signal during each exposure period and energizing the light valves during the stage of the period when the desired voltage level exists.

SUMMARY OF THE INVENTION

It is one significant purpose of the present invention to provide improved structure and method for the electrical addressing of such light valve imaging apparatus to provide predeterminedly varied exposure of photosensitive imaging medium. One important advantage of the present invention is that it is subject to implementation in structures and modes that are highly efficient from the electronics viewpoint. Another important advantage of the present invention is its improved adaptability to various modes for reducing inter-pixel transmission variation, which result in image nonuniformities. Yet another important advantage of the present invention is its utility in combination with improved light valve electrode configurations.

These and other advantages are provided by various preferred embodiments of the present invention. In general one preferred embodiment comprises in electronic imaging apparatus including (1) a linear light valve array having a plurality of discretely addressable pixels which are activatable from a light-blocking to a light transmitting condition by selective application of an electric field, (2) means for illuminating such array, and (3) addressing means for activating such pixels during successive line periods in accordance with light transmission information of respective lines of the image to be reproduced, the improvement wherein the addressing means implements line period activation by means of a plurality of discrete sub-period activations, all of a substantially constant-magnitude potential. In a highly preferred embodiment such sub-period activations are of different duration and most preferably the durations are related binarily.

In accordance with another preferred aspect of the present invention such sub-period activations are controlled by serial-in/parallel-out handling of pixel activating or non-activating signals. In another related aspect such addressing means includes exclusive-or logic adapted to control activation of the light valve electrodes in a "shared electrode mode" via a serial-in/parallel-out shift register.

In another aspect, the apparatus in accord with the present invention can include means for selectively adjusting the sub-period activations on a per-pixel basis to compensate for inter-pixel light transmission variations.

BRIEF DESCRIPTION OF THE DRAWINGS

The subsequent description of preferred embodiments of the invention refers to the attached drawings in which:

FIG. 1 is a schematic perspective view of one preferred embodiment of the present invention;

FIG. 2 is a plan view of a portion of an exemplary electro-optic modulator suitable for use in the FIG. 1 apparatus;

DETAILED DESCRIPTION OF THE PREFERRED EMBODIMENTS

Figure 3A:
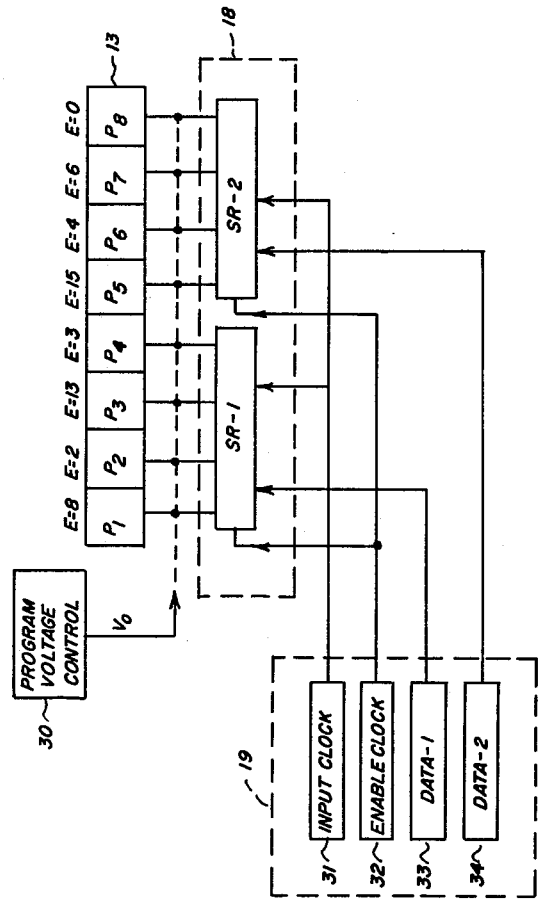
FIG. 3A is a schematic diagram of addressing means useful in accordance with the present invention.

Referring to FIG. 1, the electronic color imaging apparatus 10 there illustrated comprises an illumination source 11 for uniformly illuminating electro-optic modulator 13, through entrance polarizer 12, with different light colors in a sequential fashion. The illumination source can include, for example: (1): separately-energizable red (R), green (G) and blue (B) light sources as are illustrated in FIG. 1; (2) a panchromatic source and moving multicolor filter as disclosed in my aforementioned U.S. Pat. No. 4,229,095; (3) an electro-optically controlled source of different color illumination such as disclosed in copending U.S. patent application Ser. No. 230,096, entitled "Electronic Color Imaging Apparatus Having Improved Color Control Device", filed Jan. 29, 1981, in the name of J. M. Mir or (4) in the case of monochromatic imaging, a single source of any desired wavelength(s). It is highly desirable that such illumination be provided substantially collimated and normal to the light ingress surface of the light valve and one preferred approach for implementing this is disclosed in U.S. patent application Ser. No. 230,089, entitled "Light Valve Imaging Apparatus Having Improved Optical Configuration", filed Jan. 29, 1981, in the name of J. R. Varner.

The electro-optic modulator 13 can be formed of a material such as disclosed in U.S. Pat. No. 4,229,095 (e.g. 9/65/35 PLZT), which transforms from an isotropic, non-polar state to a birefringent polar state in response to application of an electric field. As shown in more detail in FIG. 2, the modulator has reference electrodes 21 and signal electrodes 22 formed on the surface thereof in a configuration adapted to provide discrete, separately-activatable electric fields transversely across the pixel portions $P_1-P_5$ of the electro-optic panel 20. In the embodiment illustrated in FIG. 2, the reference electrodes 21 are commonly coupled to a source of reference potential, e.g., ground, and the signal electrodes of each pixel portion are separately addressable with a potential by addressing means, e.g. serial-in/parallel-out shift register 25 to activate their respective pixels to an ON or OFF condition. U.S. patent application Ser. No. 230,095, entitled "Light Valve Imaging with Optimized Addressing Potential(s) to Reduce Inter-Pixel Nonuniformity", filed Jan. 29, 1981, in the name of J. M. Mir discloses one preferred mode of selecting potential levels and is incorporated herein by reference. An exemplary addressing ("V" potential applied, "O" no potential applied) is shown in FIG. 2 for the pixel ON, OFF conditions indicated. There are a variety of electrode configurations which can be utilized to create discrete, separately-activatable fields transversely across the discrete pixel portions of a panel of electro-optic material, some of which are disclosed in copending U.S. patent application Ser. No. 230,099, entitled "Light Valve Imaging Apparatus Having Improved Addressing Electrode Structure", and filed Jan. 29, 1981, in the names of J. M. Mir and J. R. Varner.

In general, the application of an activating field across the inter-electrode gaps "g" of a pixel portion of the electro-optic material causes it to transform to a birefringent state and rotate the direction of polarization of light passing therethrough. Thus the polarized light from entrance polarizer 12 is rotated by activated pixels and is not rotated by non-activated pixels. Exit polarizer 14 is crossed relative to entrance polarizer 12 and therefore light passing activated pixel portions of the modulator 13 passes exit polarizer while light passing non-activated modulator portions does not. Lens means illustrated schematically as 15 images the modulator array 13 at the apparatus exposure station wherepast a recording medium M is moved by transport means 16.

The movement of recording medium by transport 16, the energization of illumination source 11 by color control 17 and the activation of addressing means 25 by address control 18 are all synchronized, e.g. by central processing unit (CPU) of computer 19 so that the $P_1-P_5$ pixel portions of each line of the recording medium are exposed or not to the different colors of light in accordance with the color image information of the image to be reproduced that is input to unit 19 e.g. in the form of an electrical signal containing such color image information. It will be appreciated that all multicolor information can be input during a single pass of the recording medium (in which case the illumination source would provide at three separate color exposures per line) or that the medium can make multiple passes (e.g. once for each of red, green and blue exposures).

Figure 3B:
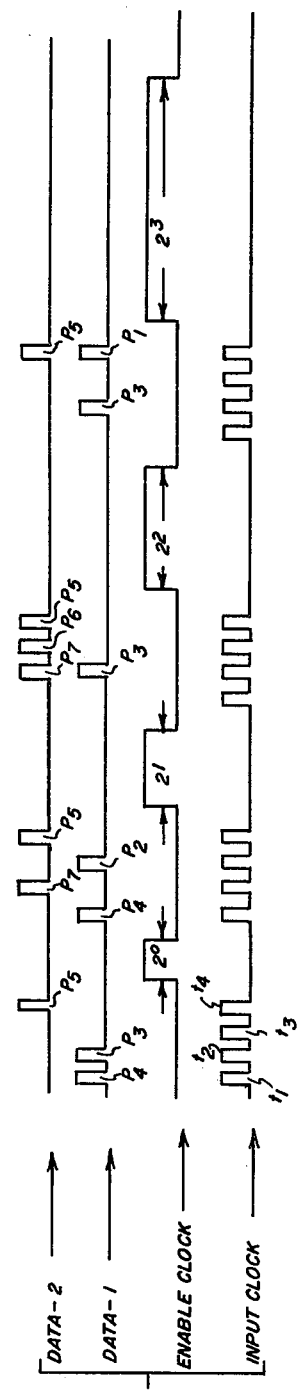
FIG. 3B is a diagram illustrating signals of the FIG. 3A device.

Referring now to FIGS. 3A and 3B, one mode in which improved addressing means in accord with the present invention, including e.g. address control 18 in cooperation with computer CPU 19, can effect electronic imaging will be explained in more detail. As shown, central processing unit (CPU) 19 comprises an input clock 31 and an enable clock 32 coupled to each of the pixel addressing shift registers SR-1 and SR-2 and data lines 33, 34 coupled respectively to shift registers SR-1 and SR-2. In FIG. 3A only eight light valve pixels ($P_1-P_8$) addressed by two 4-bit shift registers and two data lines are illustrated; however, it will be appreciated that the principles of construction and operation can be applied on greater scale. For example, when it is desired to have high resolution, 100–200 or more pixels per inch may be provided and in some continuous tone imaging 8, 12 or more bit shift registers may be desirable to avoid contouring.

FIG. 3B shows the synchronized predetermined pulse trains provided by enable and input clocks 32 and 31 for exposing the recording medium, during the line period for one color e.g. (red), with a 16 level (4-bit) gray scale. Thus it will be appreciated that in some embodiments two other separate-color line period exposures (e.g. green and blue) would occur in a similar manner while a line of the recording medium is at the exposure station to record. In combination those three sequential color-separation line exposure periods would record the color information for a line of the image to be reproduced. It will be appreciated that the present invention can also be used in black-and-white imaging and in this instance a single line period comprising only a single pulse train repetition such as shown in FIG. 3B with panchromatic light from illumination source 11 would be provided.

Considering FIG. 3B in more detail, an exemplary varying gray scale line period exposure (which could be for a single color in color imaging or for panchromatic light in black-and-white imaging) can be further understood. It may aid in understanding this function to first realize that the general approach is to provide each pixel of a given line of the recording medium with one or more fixed intensity, varying-duration doses of light during a line exposure period, such doses totaling the prescribed total exposure for the pixel. There are significant advantages to this approach some of which will be mentioned subsequently; however, first an exemplary mode for executing this approach will be described.

Thus, prior to each enablement pulse (denoted $2^0$, $2^1$, $2^2$ and $2^3$) of enablement clock 32, the shift registers' input clock 31 provides a series of register loading pulses (denoted here $t_1$, $t_2$, $t_3$ and $t_4$). It will be realized that the relative synchronization of these clocks and their synchronization with respect to multicolor light source 11 and the movement of the recording medium by drive 16 can be controlled by computer 19. The processing unit of the computer 19 also controls the application of information signals along data lines 33 and 34 in synchronization with the input clock 31. Thus information regarding the exposure $2^0$ to be applied to pixels $P_4$, $P_3$, $P_2$ and $P_1$ are applied by data line 33 to shift register SR-1 in synchronization with input pulses $t_1$, $t_2$, $t_3$ and $t_4$ respectively prior to the enablement pulse $2^0$. Data line 34 applies the same information to shift register SR-1, i.e. exposure doses $2^0$ for pixels $P_8$, $P_7$, $P_6$ and $P_5$ in timed relation with pulses $t_1$, $t_2$, $t_3$ and $t_4$ prior to enablement pulse $2^0$.

After the shift registers are so loaded with pixel exposure information for the first sub-period of the overall line exposure (i.e. the sub-period corresponding in length to the enablement pulse $2^0$), the enablement pulse $2^0$ is applied to the shift registers SR-1 and SR-2 and the voltage $V_o$ is applied to the signal electrode of pixels $P_1$–$P_8$, depending on whether their corresponding shift bit is conditioned to activate voltage application, that is depending on whether a pulse was present or not in the signal from the data line for that exposure sub-period. Thus, referring to FIG. 3B, it will be seen that light valve array pixels $P_3$, $P_4$ would be activated for the exposure period $2^0$ because information signal pulses existed on data line 33 at the $t_2$ and $t_1$ input clock pulses. Similarly light valve pixel $P_5$ is activated because data line 34 had an information signal pulse at the $t_4$ input clock pulse. It will be appreciated that activation of the addressed light valve pixels, by application of voltage $V_o$, causes them to transmit light to their respective pixel regions of the exposure station and to the line of recording medium then residing there. At the completion of the first sub-period exposure (the end of enablement clock pulse $2^0$) the shift register deactivates the application of voltage $V_o$ and the input clock applies new exposure dose signals to the shift registers based on the information signals of data lines 33 and 34. Thereafter the enablement clock activates the appropriate pixels ($P_2$, $P_4$, $P_5$ and $P_7$) of the light valve array for the next exposure sub-period $2^1$. Again, activation of the light valve pixels and thus exposure of the recording medium is terminated at the end of the enablement pulse $2^1$. In the FIG. 3B illustration similar sequences follow for enablement periods $2^2$ and $2^3$ and the total exposure of a given pixel in the line of recording medium at the exposure station is the sum of the exposures doses it received during the successive $2^0$, $2^1$, $2^2$, $2^3$ exposure sub-periods. In accordance with a highly preferred embodiment of the present invention, the durations of the exposure sub-periods differ and most preferably they differ in a binary (or similar) fashion as shown in FIG. 3B. The total exposure which would be received by various pixels $P_1$–$P_8$, for the data line signals indicated, is shown as the E=value above the addressing pixel of the light valve.

It will be appreciated that this mode of exposure requires that the analog or digital image information signals applied to computer 19 be converted from a condition indicating single total exposure value for each pixel to a condition indicating a series of sub-exposure values whose sum is equal to the desired total exposure level. This can most readily be effected by a program in the computer; however, read only memory devices coupled with appropriate storage logic and timing counters could also be used to effect this conversion.

Reiterating briefly, if for example the electrical information signal input to the computer indicates that pixel $P_3$ of the line in the exposure station should receive the exposure level of E=13, this information is converted to a series of pulses which occur at time $t_2$ on data line 33 prior to appropriate enablement clock periods, in this instance prior to the $2^0$, $2^2$ and $2^3$ exposure periods.

Having understood this mode of the present invention, one significant advantage thereof may be noted. Thus, instead of having a separate counter for each pixel, which normally would be required to effect different variable-length exposures on a per-pixel basis, two clocks can control the entire light valve array. This is extremely important from economic and fabrication viewpoints.

Figure 4:
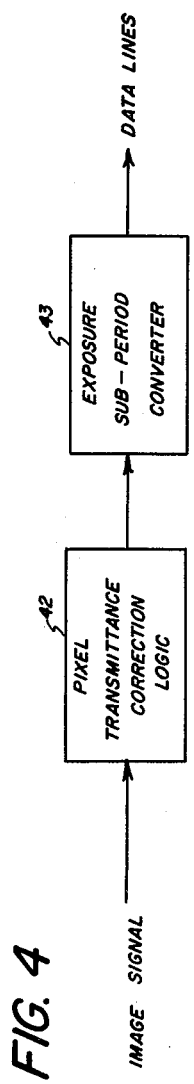
FIG. 4 is a schematic diagram of another addressing means feature in accord with the present invention.

There are several other advantageous features which can be implemented in accord with the present invention. First, this mode of operation is readily adaptable to adjustment of the applied voltage level $V_o$, which may be desirable from the viewpoint of reducing inter-pixel transmission variation as described in more detail in my aforementioned U.S. patent application Ser. No. 230,095, on that subject. Thus program voltage control 30 can be constructed to provide different activating voltages during each of the separate color line exposure periods for a given line. Also, the approach of the present invention is readily adaptable to provide for inter-pixel transmission variation correction on a per pixel basis. Thus if in the illustrated example the image signal for pixel $P_3$ indicated an exposure level E=13, but previous calibration has indicated pixel $P_3$ "over transmits" by one exposure level, the correction of E=−1 could be summed with the indicated signal value prior to its conversion to signal pulses for required exposure doses. This is illustrated schematically in FIG. 4 wherein it can be seen that prior to conversion a program of pulses for a particular exposure level by converter 43, the image signal information pertaining to an activation level for a particular light valve pixel is modified by logic 42 to correct for variation in light transmission of the particular light valve.

Figure 5:
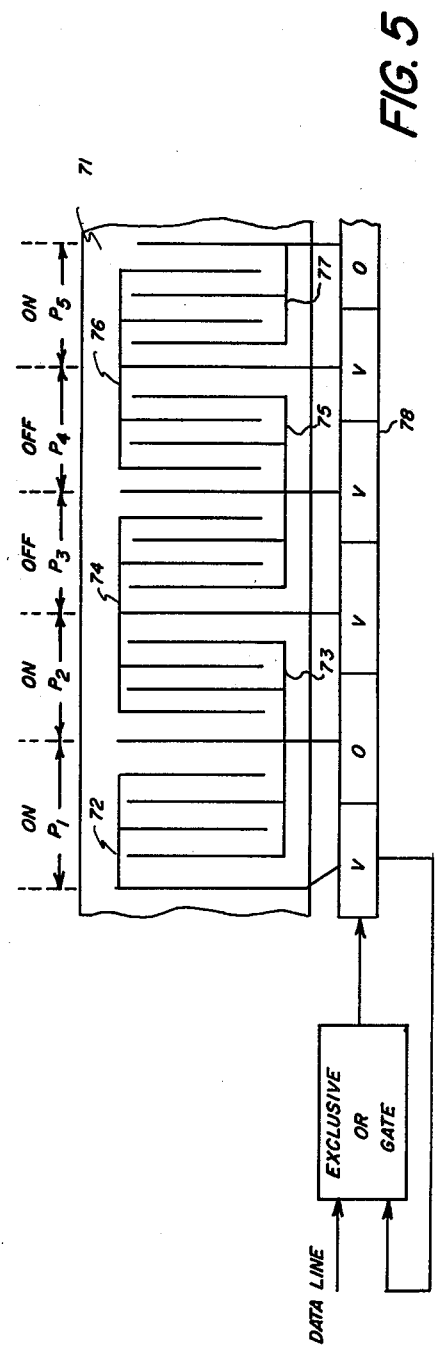
FIG. 5 is a plan view of an alternative electrode structure and addressing means useful in accord with the present invention.

FIG. 5 illustrates an alternative light valve addressing electrode configuration, which has significant advantage when used in accordance with the present invention. In this "shared-electrode" embodiment, the modulator 70 includes a plurality of separately-addressable electrode groups each coupled to addressing means, e.g. a serial-in/parallel-out shift register 78. The successive electrode groups 72–77 each include a plurality of linear branches which extend from a common line in a regularly spaced relation across the electro-optic panel 71. As shown in FIG. 5, the electrode groups have branch portions which are interleaved with branch portions of the two adjacent electrode groups. Thus, when it is desired to activate pixels $P_1$–$P_5$ to selected OFF-ON conditions the shift register can be addressed through appropriate logic circuitry, e.g. exclusive "or" logic 79. Such exclusive-or logic operation also could be carried out at the output stages of the shift registers or could be implemented using appropriate software at CPU 19. An examplary addressing for ON-OFF conditions denoted above pixels P₁-P₅ is indicated by the "V" (voltage applied) and "O" (no voltage applied) bits in shift register 78. In this embodiment it will be noted that the field is applied across each pixel region by five fine wire electrodes.

The use of such a "shared electrode" configuration (i.e. having adjacent electrodes both selectively addressed to respective ON or OFF conditions to determine the field condition) has particular advantage and is particularly useful in combination with the imaging approach of the present invention wherein exposure is implemented in a plurality of sub-periods, each being controlled via a separate addressing of the shift register. More specifically, if the reference electrode 21 of the FIG. 2 embodiment is cracked or otherwise shorted, all pixels separated from the reference potential source by the short would be substantially inoperative. Also, the long conductive path to electrodes can cause a potential variation between different reference electrodes. However, separately-addressable electrodes do not suffer from the same degree of shorting risk or from potential variations as do those arrays where pixels have a common reference electrode such as shown in FIG. 2. Therefore, advantages exist with respect to shared electrode configurations. Nevertheless, it will be noted that where gray scale is achieved by different pixels implementing different length exposures, the shared electrode configuration would not be desirable without the multiple sub-period readdressing afforded by the present invention. Thus the feature of multiple sub-period addressing not only facilitates the other noted advantages in constant-voltage, gray scale imaging, but facilitates shared-electrode operation modes with their own advantages.

The invention has been described in detail with particular reference to certain preferred embodiments thereof, but it will be understood that variations and modifications can be effected within the spirit and scope of the invention.

What is claimed is:

1. In electronic imaging apparatus of the type including (1) a linear light valve array which comprises a plurality of discrete, independently addressable pixels activatable between light transmitting and non-transmitting conditions by selective application of an electrical field and a plurality of spaced linear electrodes adapted to apply electrical fields transversely across pixels of said array, (2) means for illuminating elements of said array with light and (3) addressing means for activating predetermined of said array pixels during a line exposure period in accordance with pixel transmission information of a line of the image to be reproduced, the improvement wherein said addressing means includes means for effecting a line exposure period activation of said array by enabling a plurality of distinct sub-period array activations and exclusive-or logic means for controlling energization of predetermined ones of said electrodes during such sub-period activations.

2. The invention defined in claim 1 wherein said sub-period array activations are of substantially constant-magnitude potential throughout their respective durations.

3. The invention defined in claim 1 wherein said addressing means includes serial-in/parallel-out shift register means having an input adapted to receive a electrical signal containing image information and outputs respectively coupled to elements of said light valves.

4. The invention defined in claim 3 wherein substantially all of said electrodes are addressed via elements of said shift register.

5. The invention defined in claim 4 further including exclusive-or gate means for applying such video signal to said shift register means.

6. The invention defined in claim 1 wherein said sub-period array activations are of different duration.

7. The invention defined in claim 1 wherein the durations of the sub-period array activations that comprise an overall line exposure period activation are binarily related.

8. The invention defined in claim 1 further including means for selectively adjusting the sub-period activations of said array on a pixel-by-pixel basis to compensate for inter-pixel light transmission variations.

9. In electronic imaging apparatus of the type including (1) a linear light valve array which comprises a plurality of discretely addressable pixels activatable between light transmitting and non-transmitting conditions by selective application of an electrical field and a plurality of spaced linear electrodes adapted to apply electrical fields transversely across pixels of said array, (2) means for providing scanning movement between said array and a photosensitive image medium to facilitate successive line exposure periods of different portions of such image medium, (3) means for illuminating elements of said array with light and (4) addressing means for activating predetermined of said array pixels during each successive line exposure period in accordance with density information of respective lines of the image to be reproduced, the improvement wherein said addressing means includes (1) means for effecting each overall line exposure period activation of said array by enabling a plurality of distinct sub-period array activations, of substantially constant-magnitude potential throughout their respective durations, and (2) exclusive-or logic means for controlling energization of predetermined ones of said electrodes during such sub-period activations.

10. The invention defined in claim 9 wherein said addressing means includes serial-in/parallel-out shift register means having an input adapted to receive a electrical signal containing image information and outputs respectively coupled to elements of said light valves.

11. The invention defined in claim 10 wherein substantially all of said electrodes are addressed via elements of said shift register.

12. The invention defined in claim 11 further including exclusive-or logic means for applying such electrical signal to said shift register means.

13. The invention defined in claim 9 wherein said sub-period array activations are of different duration.

14. The invention defined in claim 9 wherein the durations of the sub-period array activations that comprise an overall line exposure period activation are binarily related.

15. The invention defined in claim 9 wherein the durations of the sub-period array activations are related as powers of a base.

16. The invention defined in claim 9 further including means for selectively adjusting the sub-period activations of said array on a pixel-by-pixel basis to compensate for inter-pixel light transmission variations.

17. In the method of imaging wherein a light valve array, of the type including a plurality of discretely addressable pixel regions arranged in a line and adapted to selectively transmit or block light in response to respective electrical activations by spaced electrodes, is addressed in accordance with an electrical signal containing information for the respective pixel transmission of a line of the image to be reproduced, the improvement comprising addressing the pixel regions a plurality of times respectively during sub-periods of a given line transmission period and exclusive-or gating line information to said electrodes.

18. The method defined in claim 17 wherein the sub-periods of a light transmission period are of different duration.

19. The method defined in claim 18 wherein the different durations of the sub-periods are binarily related.

20. The invention defined in claim 17 wherein the sub-period addressing of all pixel regions of the line is effected concurrently.

21. The invention defined in claim 17 wherein all sub-period activating addressings for a given line transmission period are effected with the same magnitude potential.

* * * * *